United States Patent
Isaacson et al.

(10) Patent No.: US 10,887,290 B2
(45) Date of Patent: Jan. 5, 2021

(54) OPERATING ENVIRONMENT PARTITIONING FOR SECURING GROUP COMMUNICATION DEVICE RESOURCES

(71) Applicant: Orion Labs, San Francisco, CA (US)

(72) Inventors: Andrew Isaacson, San Francisco, CA (US); Dan Phung, San Francisco, CA (US); Schuyler Erie, San Francisco, CA (US); Neil Girling, Oakland, CA (US); Jesse Robbins, San Francisco, CA (US)

(73) Assignee: Orion Labs, San Francisco, CA (US)

( * ) Notice: Subject to any disclaimer, the term of this patent is extended or adjusted under 35 U.S.C. 154(b) by 220 days.

(21) Appl. No.: 16/120,048

(22) Filed: Aug. 31, 2018

(65) Prior Publication Data

US 2019/0075085 A1 Mar. 7, 2019

Related U.S. Application Data

(60) Provisional application No. 62/553,440, filed on Sep. 1, 2017.

(51) Int. Cl.
*H04L 29/06* (2006.01)
*G06F 9/455* (2018.01)
(Continued)

(52) U.S. Cl.
CPC ...... *H04L 63/0428* (2013.01); *G06F 9/45558* (2013.01); *G06F 21/53* (2013.01); *G06F 21/602* (2013.01); *G06F 21/629* (2013.01); *H04L 9/3242* (2013.01); *H04L 63/104* (2013.01); *H04W 12/04* (2013.01); *H04W 12/08* (2013.01); *H04W 12/0806* (2019.01); *G06F 2009/45587* (2013.01); *G06F 2009/45595* (2013.01); *G06F 2221/2105* (2013.01); *H04W 12/0013* (2019.01);
(Continued)

(58) Field of Classification Search
CPC . H04L 63/0428; H04L 9/3242; H04L 63/104; H04W 12/0806; H04W 12/04; H04W 12/08; G06F 9/45558; G06F 21/53; G06F 21/602; G06F 21/629
See application file for complete search history.

(56) References Cited

U.S. PATENT DOCUMENTS 9,749,294 B1 * 8/2017 Marquardt .......... H04L 63/0209
2008/0077993 A1 * 3/2008 Zimmer ................ G06F 21/575
726/27
(Continued)

*Primary Examiner* — Shanto Abedin

(57) ABSTRACT

The present disclosure is directed to systems, methods and devices for securing communication resources of group communication devices. Secure resources of a group communication computing device may be maintained in a secure operating environment of the group communication computing device, which is separate from a normal operating environment of the group communication computing device, via a trust partition comprising one or both of an SoC trust partition and a hypervisor. The secure operating environment may comprise input resources including a microphone, a camera, audio encoding and decoding engines, audio encryption and decryption engines, and a secure operating system. The normal operating environment may comprise resources including LTE and WiFi communication resources, transport layer security layer resources, and an operating system.

20 Claims, 6 Drawing Sheets

(51) Int. Cl.

| | |
|---|---|
| *H04W 12/08* | (2009.01) |
| *H04L 9/32* | (2006.01) |
| *H04W 12/04* | (2009.01) |
| *G06F 21/60* | (2013.01) |
| *G06F 21/62* | (2013.01) |
| *G06F 21/53* | (2013.01) |
| *H04W 84/04* | (2009.01) |
| *H04W 12/00* | (2009.01) |
| *H04W 12/10* | (2009.01) |

(52) U.S. Cl.
CPC ...... *H04W 12/1008* (2019.01); *H04W 84/042* (2013.01)

(56) References Cited

U.S. PATENT DOCUMENTS

| | | | | |
|---|---|---|---|---|
| 2009/0193486 A1* | 7/2009 | Patel | ............ | H04N 5/76 |
| | | | | 725/114 |
| 2013/0067467 A1* | 3/2013 | Aslot | ............ | G06F 11/0778 |
| | | | | 718/1 |
| 2013/0281058 A1* | 10/2013 | Obaidi | ............ | H04W 12/06 |
| | | | | 455/411 |
| 2015/0127866 A1* | 5/2015 | Zeng | ............ | G06F 13/24 |
| | | | | 710/264 |
| 2016/0314299 A1* | 10/2016 | Almer | ............ | H04L 63/0428 |

* cited by examiner

OPERATING ENVIRONMENT PARTITIONING FOR SECURING GROUP COMMUNICATION DEVICE RESOURCES

RELATED APPLICATIONS

This application is related to, and claims priority to, U.S. Provisional Application No. 62/553,440, entitled "Operating Environment Partitioning For Securing Group Communication Device Resources," and filed on Sep. 1, 2017, which is hereby incorporated by reference in its entirety.

BACKGROUND

Malicious third-parties often attempt to gain access to communication hardware and resources of mobile computing devices. Such hardware and resources that are targets of those attacks include input devices such as cameras, microphones, keyboards, and their corresponding communication interfaces. Malicious third-parties typically gain access to an input device by breaching LTE and/or WiFi resources associated with the target mobile computing device, which are typically under the control of a single computer operating environment and operating system that also control the targeted input device.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential feature of the claimed subject matter, nor is it intended to be used as an aid in determining the scope of the claimed subject matter.

Non-limiting examples of the present disclosure describe systems, methods, and devices for securing communication resources of group communication computing devices. Group communication computing device resources, such as a speaker, a microphone, a camera, a secure operating system, an audio encryption engine, an audio decryption engine, an audio encoding engine, and an audio decoding engine, may be partitioned, via a trust partition, in a secure operating environment of a group communication device, which is maintained separately from a normal operating environment of the group communication device, which may comprise LTE communication resources, WiFi resources, transport layer security resources, and a normal operating system. In some examples, the secure operating environment and the normal operating environment may be physically partitioned via an SoC having a secure monitor. In other examples, the secure operating environment and the normal operating environment may comprise virtual machines partitioned via a hypervisor. In still other examples, the secure operating environment and the normal operating environment may be partitioned via an SoC having a secure monitor and via a hypervisor.

DETAILED DESCRIPTION

Figure 1:
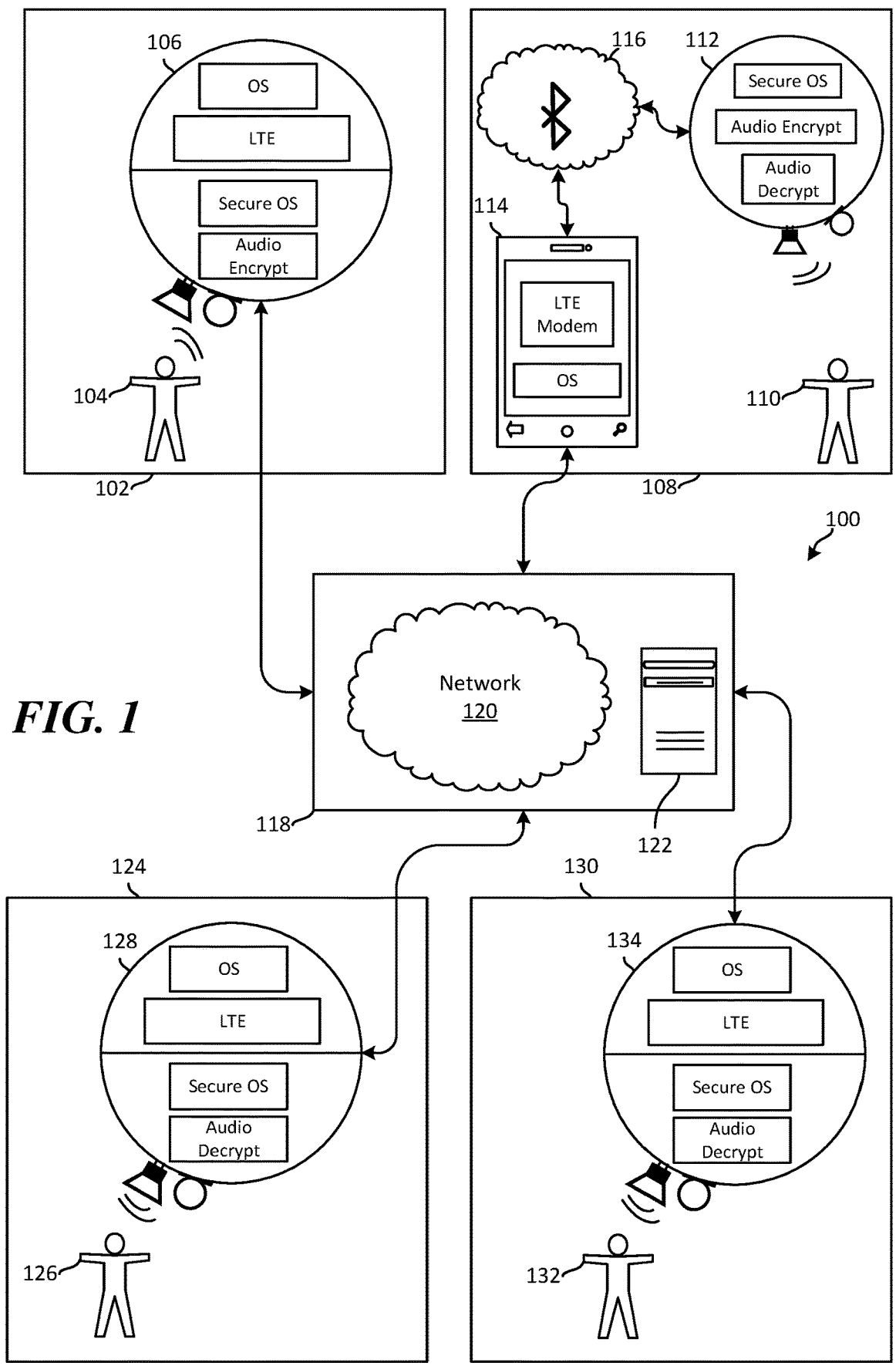
FIG. 1 is a schematic diagram of an exemplary environment for protecting the integrity of computing devices, and their corresponding resources, associated with the sending and receiving of group communications.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Generally, the present disclosure is directed to systems, methods and devices for securing resources of group communication computing devices. Secure resources of the group communication computing devices may be partitioned from normal resources of the group communication computing devices via a trust partition. The trust partition may comprise an SoC trust partition and/or a hypervisor for segregating secure resources in a secure operating environment of a group communication computing device, from normal, resources in a normal operating environment of a group communication computing device.

The resources being secured may comprise devices physically connected to the computing devices, such as cameras, microphones, keyboards and other input devices and their corresponding communication interfaces, which may be connected physically or via one or more network communication means (e.g., WiFi, BLE, etc.). In examples, such resources may be secured via physical SoC partitioning, virtual machine partitioning, firmware partitioning, software partitioning and/or a combination of the same. According to examples, group communication device resources that may be maintained and controlled via one or more normal operating environments may comprise resources including an operating system (e.g., Linux, iOS, Android, etc.), LTE communication resources (e.g., modems, network connection applications, etc.), WiFi communication resources, and TLS layer resources, among others.

FIG. 1 is a schematic diagram of an exemplary environment 100 for protecting the integrity of computing devices, and their corresponding resources, associated with the sending and receiving of group communications. Exemplary environment 100 includes first communication environment 102, second communication environment 108, third communication environment 124, fourth communication environment 130, and network communication and processing environment 118.

First communication environment 102 includes user 104 and group communication computing device 106. Second communication environment 108 includes user 110, group communication computing device 112, and LTE-enabled computing device 114, which may communicate one or more recorded audio packets with one another via BLE network 116. Third communication environment 124 includes user 126 and group communication computing device 128. Fourth communication environment 130 includes user 132 and group computing device 134.

Each of group communication computing devices 106, 128, and 134 comprise a secure operating environment comprising a secure operating system for managing interfaces between secure resources (e.g., microphones, speakers, cameras, etc.) and each corresponding group communication computing device, and audio encryption and decryption engines which function as part of a voice messaging application maintained by the secure operating environments of group communication devices 106, 128, and 134. The secure, operating environment of each of group communication computing devices 106, 128, and 134 may also comprise an audio encoding engine and an audio decoding engine as part of the voice messaging application. Each of group communication devices 106, 128, and 134 also comprise a normal operating environment comprising an operating system for managing normal computing device resources, including at least LTE communication resources (e.g., an LTE modem, LTE connection applications, etc.).

Alternatively, group communication device 112 does not include LTE communication resources. Rather, group communication device 112 comprises a secure operating system for managing interfaces between secure resources (e.g., microphones, speakers, cameras, etc.) and connected group communication device 112, as well as an audio encryption engine, an audio decryption engine, an audio encoding engine, an audio decoding engine, and a BLE modem for transmitting and receiving BLE communications to and from other BLE-enabled computing devices, including LTE-enabled computing device 114 via BLE network 116. LTE-enabled computing device 114 comprises a normal operating environment comprising an operating system for managing normal computing device resources, including at least LTE communication resources (e.g., an LTE modem, LTE connection applications, etc.), and a BLE modem for transmitting and receiving BLE communications to and from other BLE-enabled computing devices, such as group communication device 112.

Each of the group communication computing devices in exemplary environment 100 typically include at least some form of computer readable media. Computer readable media includes any available media that can be accessed by an associated group communication computing device. By way of example, computer readable media includes computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by an associated group communication computing device. Computer readable media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

User 104 may provide an audio input to a microphone integrated with the secure operating environment of group communication computing device 106. In some examples, user 104 may turn group communication device 106 on, and activate audio collection, via one or more integrated microphones, by suppressing the surface of group communication computing device 106 such that an activation button is suppressed, and audio may then be recorded by group communication computing device 106. Audio recording may cease upon user 104 no longer pressing on the surface of group communication device 106. In some examples, in addition or alternative to recording audio communications upon suppression/non-suppression of the surface of group communication computing device 106, audio may be dynamically processed and streamed based on timing of the suppression/non-suppression of the surface of group communication computing device 106. In yet other examples, rather than suppressing and/or not suppressing the surface of group communication computing device 106 to facilitate the recording and/or streaming of audio to group communication computing device 106, one or more alternative input mechanisms may be employed to accomplish the same. For example, a button may be pressed, a touch sensor may be activated, a voice command may be received, etc.

The audio communicated from user 104 may be received and recorded by one or more resources of group communication computing device 106 operating in a secure operating environment, as indicated by lower portion of group communication computing device 106 (e.g., secure OS, audio encryption—below the line separating the secure operating environment and the normal operating environment of group communication computing device 106).

Upon receiving the audio input from user 104, an audio encryption and/or encoding engine may process the received audio into one or more packets in the secure operating environment of group communication computing device 106 and transfer those packets to the normal operating environment of group communication device 106 (the normal operating environment shown for illustrative purposes above the horizontal line in group communication computing device 106) for LTE transfer and processing at a remote management platform via network 120.

In some examples, the processing of the received audio content by an audio encryption and/or encoding engine may comprise analyzing the audio content and parsing it into one or more messaging packets in a format such as one or more Opus codec packets, each of which may comprise N audio packet fragments. Additionally, the processing of the received audio content from user 104 may comprise packaging the audio content from its native format, into one or more formats that may be transferred from an LTE interface of the normal operating environment of group communication computing device 106 to one or more additional group communication computing devices, via a network, such as network 120.

Upon receiving the processed audio content, the normal operating environment of group communication computing device 106 may send one or more encoded packets, via an LTE modem and network 120, comprising the processed audio content to one or more server computing devices, such as server computing device 122, comprising a remote management platform. The one or more packets sent to the remote management platform may comprise an IP address corresponding to the group communication computing device 106, which may be matched by the remote management platform against a group communication list for that specific IP address. The group communication list may comprise a plurality of additional IP addresses, one or more of which may be linked to the IP address for group communication computing device 106. That is, group communication computing device 106 may be associated, via the remote management platform, to one or more additional group communication computing devices such that when user 104 provides audio to group communication computing device 106, that audio is encoded, sent to the remote management platform, via network 120, and transferred from server computing device 122 to the one or more additional group communication computing devices to which it is associated with.

According to some examples, the normal operating environment of group communication device 106 may include a transport layer security (TLS) layer comprising one or more of: an encryption engine for obfuscating the encoded audio communication received from user 104 to server computing device 122; an authentication engine for authenticating the identify of group communication computing device 106 to server computing device 122 and/or authenticating the identify of server computing device 122; and a communication integrity engine for preventing message loss and/or alteration during transfer of the audio communication to server computing device 122.

In exemplary environment 100, the audio communication received from user 104 may be sent, via network 120, to each of the group communication devices in second communication environment 108, third communication environment 124, and fourth communication environment 130. Specifically, an LTE communication comprising the audio content from group communication computing device 106 may be received by LTE-enabled computing device 114 in second communication environment 108, and subsequently transferred to group communication computing device 112, via BLE network 116. If encrypted, the audio content my then be decrypted by group communication computing device 112 and an associated decryption engine. The audio content may similarly be decoded for audio playback by group communication computing device 112 and an associated decoding engine, and played back via a speaker associated with group communication computing device 112 such that user 110 receives the audio that was received and sent from group communication computing device 106.

In various embodiments, the types of networks used for communication between the computing devices that makeup the present invention include, but are not limited to, an Internet, an intranet, wide area networks (WAN), local area networks (LAN), virtual private networks (VPN), cellular networks, and additional satellite based data providers such as the Iridium satellite constellation which provides voice and data coverage to satellite phones, pagers and integrated transceivers, etc. According to aspects of the present disclosure, the networks may include an enterprise network and a network through which a client computing device may access an enterprise network. According to additional aspects, a client network is a separate network accessing an enterprise network through externally available entry points, such as a gateway, a remote access protocol, or a public or private Internet address.

In exemplary environment 100, an LTE signal comprising the audio content received from user 104, and corresponding group communication computing device 106, may be received by LTE modems in the normal operating environments of group communication computing devices 128 and 134, and subsequently sent to the secure operating environments of group communication computing devices 128 and 134. If encrypted, the LTE signals comprising the received audio may be decrypted by a decryption engine in each of the secure operating environments of group communication computing devices 128 and 134. Similarly, the LTE signals comprising the received audio may be decoded for audio playback by the secure operating environments of group communication computing devices 128 and 134, and played back via speakers associated with the secure operating environments of group communication computing devices 128 and 134, such that users 126 and 132 receive the audio that was sent from group communication computing device 106.

Figure 2:
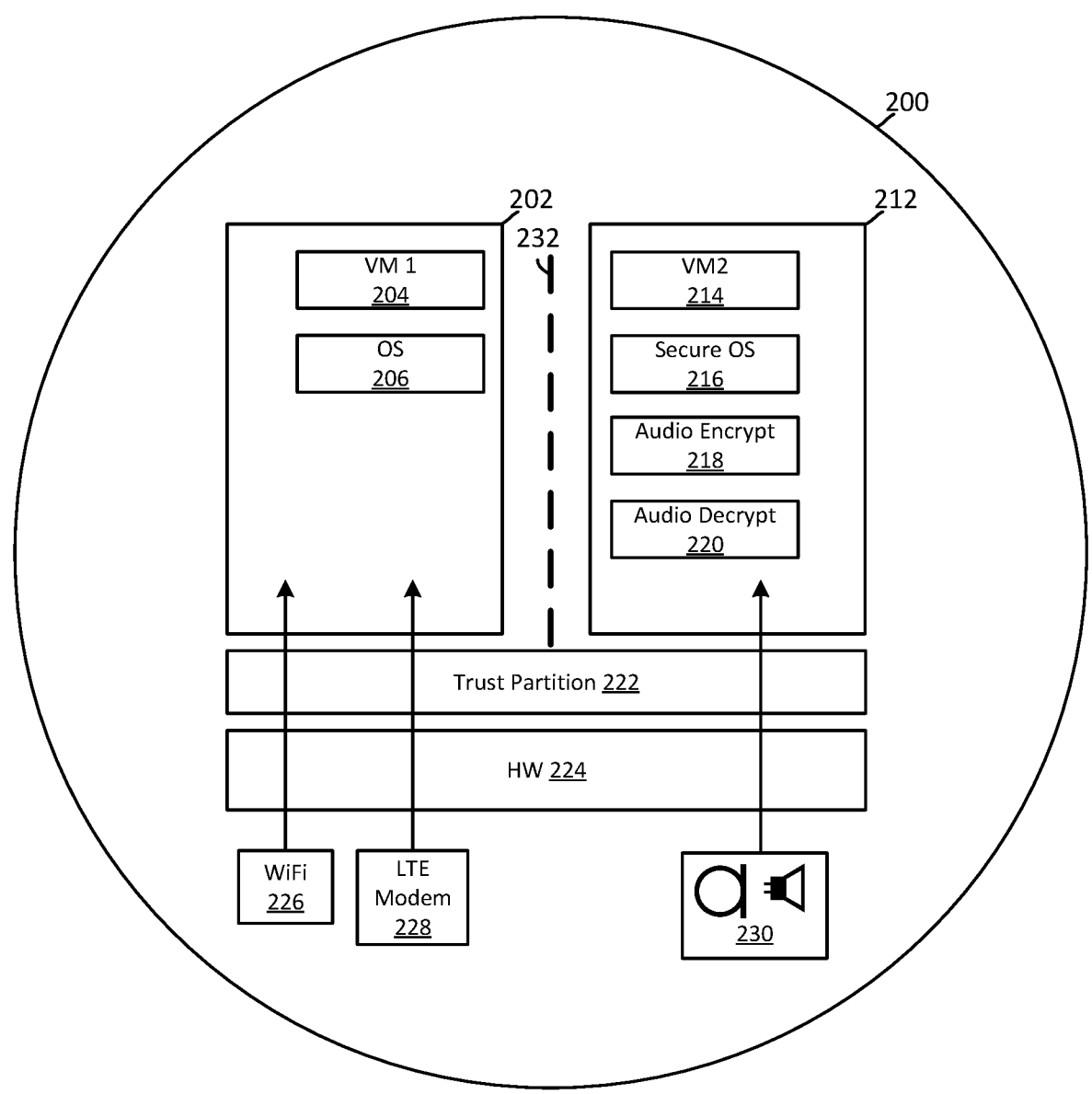
FIG. 2 is a simplified block diagram of a group communication computing device, including a trust partition, for protecting the integrity of trusted computing device resources utilized in sending and receiving group communications.

FIG. 2 is a simplified block diagram of a group communication computing device 200, including a trust partition 222, for protecting the integrity of secure computing device resources utilized in sending and receiving group communications. The group communication computing device 200 is one example of group communication computing devices 106, 128, and 134 depicted in exemplary environment 100 illustrated in FIG. 1.

Group communication computing device 200 comprises a normal operating environment 202, and a secure operating environment 212, which are illustrated as being separate from one another by trust line 232. Group communication computing device 200 further comprises trust partition 222, and hardware 224. Group communication computing device 200 also comprises WiFi resources 226 and LTE modem 228, which are operatively connected to normal operating environment 202, and microphone and speaker 230, which are operatively connected to secure operating environment 212.

The normal operating environment 202 and the secure operating environment 212 are partitioned via trust partition 222. According to some examples, trust partition 222 may partition normal operating and environment 202 and secure operating environment 212 by a division of hardware resources. That is, normal operating environment 202 and the secure operating environment 212 may be partitioned by trust partition 222 such that each of those operating environments comprises a segregated hardware set of a system-on-chip (SoC). For example, the normal operating environment 202 and the secure operating environment 212 may define one or more processors, peripherals, memory addresses, and areas of cache as running as "secure" or "non-secure" hardware. Trust partition 222 may dynamically expose the full SoC to secure software, or expose a subset of the SoC to normal software. As such, the trust partition 222 ensures that a normal, or non-secure, processor can access only non-secure resources and receive only non-secure interrupts. In a specific example, trust partition 222 may segregate normal operating environment 202 from secure operating environment 212 utilizing TRUSTZONE® technology produced by ARM®.

One or more program modules can be stored in memory or a storage device associated with one or both of normal operating environment and/or secure operating environment 212, including one or more operating system, one or more application programs, other program modules (such as the software engines described herein), and program data. Examples of program modules and engines that may be used in accordance with aspects of the present disclosure may include: an audio encoding engine, an audio decoding engine, an authentication engine, and a communication integrity engine.

According to examples, a user may provide input to group communication computing device via a microphone and a touch sensor (such as a touchpad, a suppression sensor, or a touch sensitive display). Additional examples may include other input devices.

In the example provided by FIG. 2, the trust partition 222 provides the normal operating environment 202, and OS 206, with access to WiFi resources 226 and LTE resources, such as LTE modem 228. Likewise, the trust partition 222 ensures that a secure, or trusted, processor can access secure resources, providing secure operating environment 212 and secure OS 216, with access to microphone and speaker 230. Unlike the hardware subset in which the normal operating environment 202 software runs, software running within the secure operating environment 212 has complete access to all of the SoC hardware. Thus, from the perspective of the secure operating environment 212's execution, the system may be perceived as being nearly identical to what would be seen on a processor that does not implement trust partition 222. As such, the secure software running on secure operating environment 212 may have access to all resources associated with both the secure operating environment 212 and the normal operating environment 202. Thus, resources in the secure operating environment 212 (including the speaker and microphone 230), which are under the control of a trust monitor associated with secure operating environment 212, are much more difficult to hack or otherwise become compromised due to a malicious third-party attack because they are maintained separate and distinct from access points such as the LTE modem 228 and WiFi resources 226, which are under the control of the normal operating environment 202 and its corresponding hardware.

In some examples, secure operating environment 212 may be provided with access to audio encryption engine 218 and audio decryption engine 220. In other examples, normal operating environment 202 may be provided with access to an audio encryption engine and an audio decryption engine. Thus, an audio encryption engine and/or an audio decryption engine may be allocated to one of normal operating environment 202 and/or secure operating environment 212, and access to those respective engines may be provided based on that allocation by trust partition 222. In additional examples, although not shown, normal operating environment 202 and/or secure operating environment 212 may be provided with access to an audio encoding engine and an audio decoding engine for encoding and decoding received audio content to and from an audio codec format such as an Opus codec format.

According to other examples, the normal operating environment 202 and the secure operating environment 212 are partitioned via trust partition 222 such that each of those operating environments comprise individual virtual machines. For example, trust partition 222 may comprise a hypervisor and normal operating environment 202 may comprise a first virtual machine 204, while secure operating environment 212 may comprise a second virtual machine 214. When the trust partition 222 comprises a hypervisor, as opposed to a physical partition (i.e., an SoC partition), the group communication computing device 200, as well as external computing devices which may communicate with (or otherwise attempt to access) group communication computing device 200, will recognize the first virtual machine 204, as well as its corresponding resources (e.g., operating system 206, WiFi resources 226, and LTE modem 228), as operating separate and distinct from other computing devices and other virtual machines and their corresponding resources operating as part of group communication computing device 200.

Similarly, when trust partition 222 comprises a hypervisor, as opposed an actual hardware partition (i.e., an SoC partition), the group communication computing device 200, as well as external computing devices which may be in communication with, and/or otherwise attempt to access, group communication computing device 200, will recognize the second virtual machine 212, as well as its corresponding resources (e.g., secure operating system 216, audio encryption engine 218, audio decryption engine 220, and speaker and microphone 230), as operating separate and distinct from other virtual machines and their corresponding resources operating as part of group communication computing device 200. As such, resources in the secure operating environment 212 (including the speaker and microphone 230), which are under the control of the second virtual machine 214, are more difficult to hack or otherwise become comprised due to a malicious third-party action because they are maintained separate and distinct from third-party entry access points such as the LTE modem 228 and WiFi resources 226, which are under the control of the first virtual machine 204 in normal operating environment 202.

Figure 3:
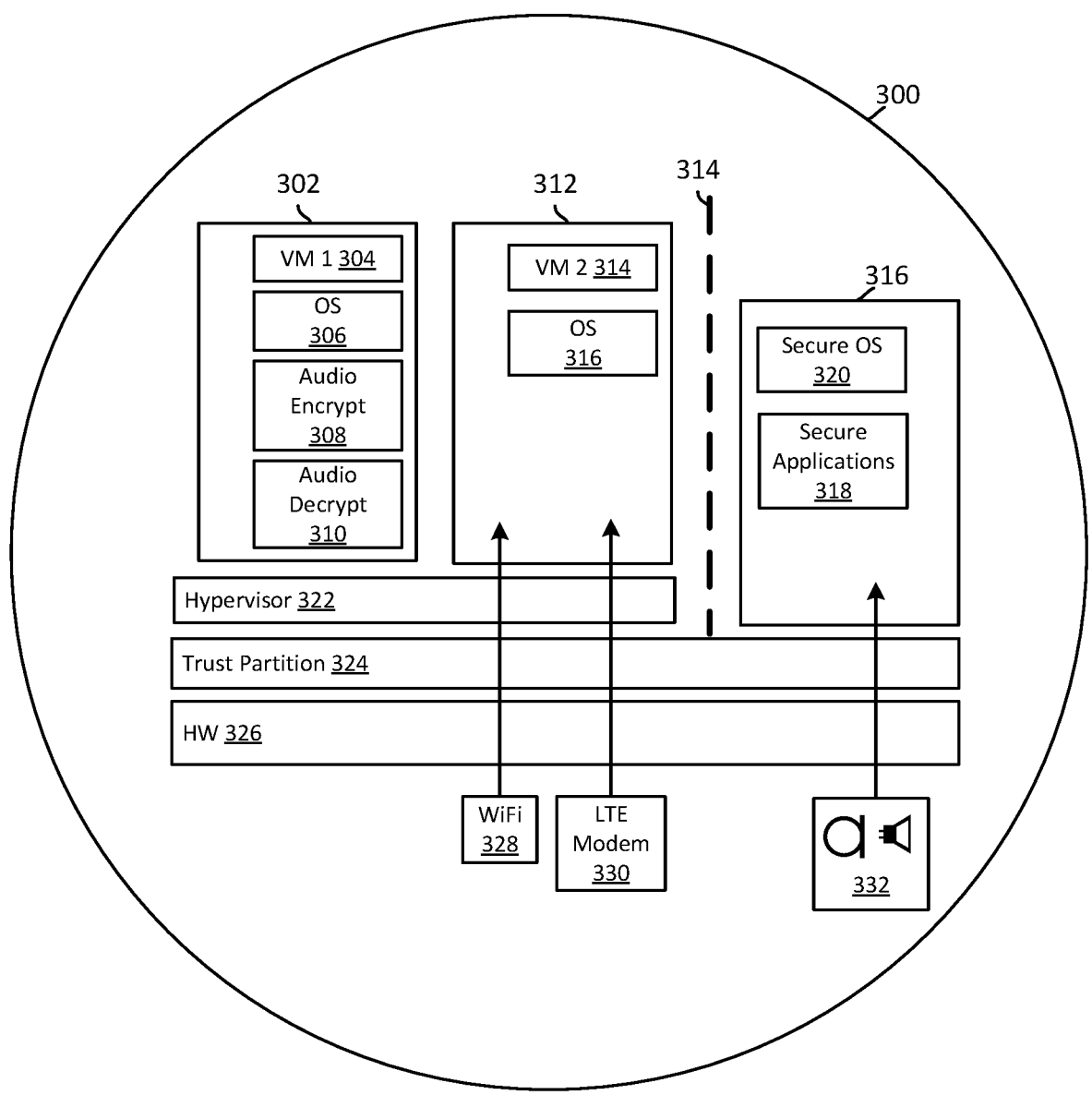
FIG. 3 is a simplified block diagram of a group communication computing device, including an SoC trust partition and a hypervisor, for protecting the integrity of trusted computing device resources utilized in sending and receiving group communications.

FIG. 3 is a simplified block diagram of a group communication computing device 300, including a trust partition and a hypervisor, for protecting the integrity of trusted computing device resources utilized in sending and receiving group communications. Group communication computing device 300 is another example of group communication computing devices 106, 128, and 134 depicted in exemplary environment 100 illustrated in FIG. 1.

Group communication computing device 300 comprises secure operating environment 316, first normal operating environment 302, and second normal operating environment 312. First normal operating environment 302 and second normal operating environment 312 are illustrated as being separate from secure operating environment 316 by trust line 232. Group communication computing device 300 further comprises hypervisor 322, trust partition 324, and hardware 326. Group communication computing device 300 also comprises WiFi resources 328 and LTE modem 330, which are operatively connected to second normal operating environment 312, and microphone and speaker 332, which are operatively connected to secure operating environment 316.

First and second normal operating environments 302 and 312 are partitioned from secure operating environment 316 via trust partition 322. According to some examples, trust partition 322 may partition first and second normal operating environments 302 and 312 from secure operating environment 316 by a division of hardware resources. That is, first and second normal operating environments 302 and 312 may be partitioned from secure operating environment 316 by trust partition 322 by a segregated hardware set of an SoC. For example, the first and second normal operating environments 316 and 322 may define one or more processors, peripherals, memory addresses, and areas of cache as running as "non-secure" hardware, and secure operating environment 316 may define one or more processors, peripherals, memory addresses, and areas of cache as running as "secure" hardware. Trust partition 324 may dynamically expose the full SoC to secure software, or expose a subset of the SoC to normal software. As such, trust partition 324 ensures that a normal, or non-secure, processor can access only non-secure resources and receive only non-secure interrupts. In a specific example, trust partition 324 may segregate first and second normal operating environments 302 and 312 from secure operating environment 316 utilizing TRUSTZONE® technology produced by ARM®.

In the example provided by FIG. 3, the trust partition 324 allows the normal operating environments, and the corresponding operating systems (OS 306 and OS 316) to access normal, or non-secure, resources comprising audio encryption engine 308, audio decryption engine 310, WiFi resources 328 and LTE resources, such as LTE modem 330. Likewise trust partition 324 ensures that a secure, or trusted, processor can access secure resources, providing secure operating environment 316, and secure OS 320, with access to microphone and speaker 332. Unlike the hardware subset in which first and second normal operating environments 302 and 312 software runs, software running within the secure operating environment 316 has complete access to all of the SoC hardware. Thus, from the perspective of the secure operating environment 316's execution, the system may be perceived as being nearly identical to what would be seen on a processor that does not implement trust partition 324. As such, the secure software running on secure operating environment 316 may have access to all of the resources associated with both the secure operating environment 316 and the first and second normal operating environments 302 and 312. Thus, resources in the secure operating environment 316 (including the speaker and microphone 332), which are under control of a trust monitor associated with secure operating environment 316, are more difficult to hack or otherwise become compromised due to a malicious third-party action because they are maintained separate and distinct from third-party access points such as the LTE modem 330 and WiFi resources 328, which are under the control of second normal operating environment 312 and its corresponding hardware.

Hypervisor 322 may provide additional protection against malicious third-party actions aimed at compromising the integrity of one or more of the resources of group communication computing device 300. Hypervisor 322 provides software virtualization between first normal operating environment 302 and second normal operating environment 312, such that those environments are perceived as individual hardware components or machines. Specifically, hypervisor 322 partitions first and second normal operating environments 302 and 312 from one another such that first normal operating environment 302 comprises first virtual machine 304, and second normal operating environment 312 comprises second virtual machine 314. First virtual machine 304, and corresponding OS 306, has access to audio encryption engine 308 and audio decryption engine 310. Second virtual machine 314, and corresponding OS 316, has access to WiFi resources 328 and LTE resources, including LTE modem 330. As such, a malicious third-party attempting to access or otherwise compromise audio encryption engine 308 and/or audio decryption engine 310 would face an additional security measure comprised of virtual machine partitioning of those resources from their likely points of attack at WiFi resources 328 and/or the LTE modem 330.

Figure 4:
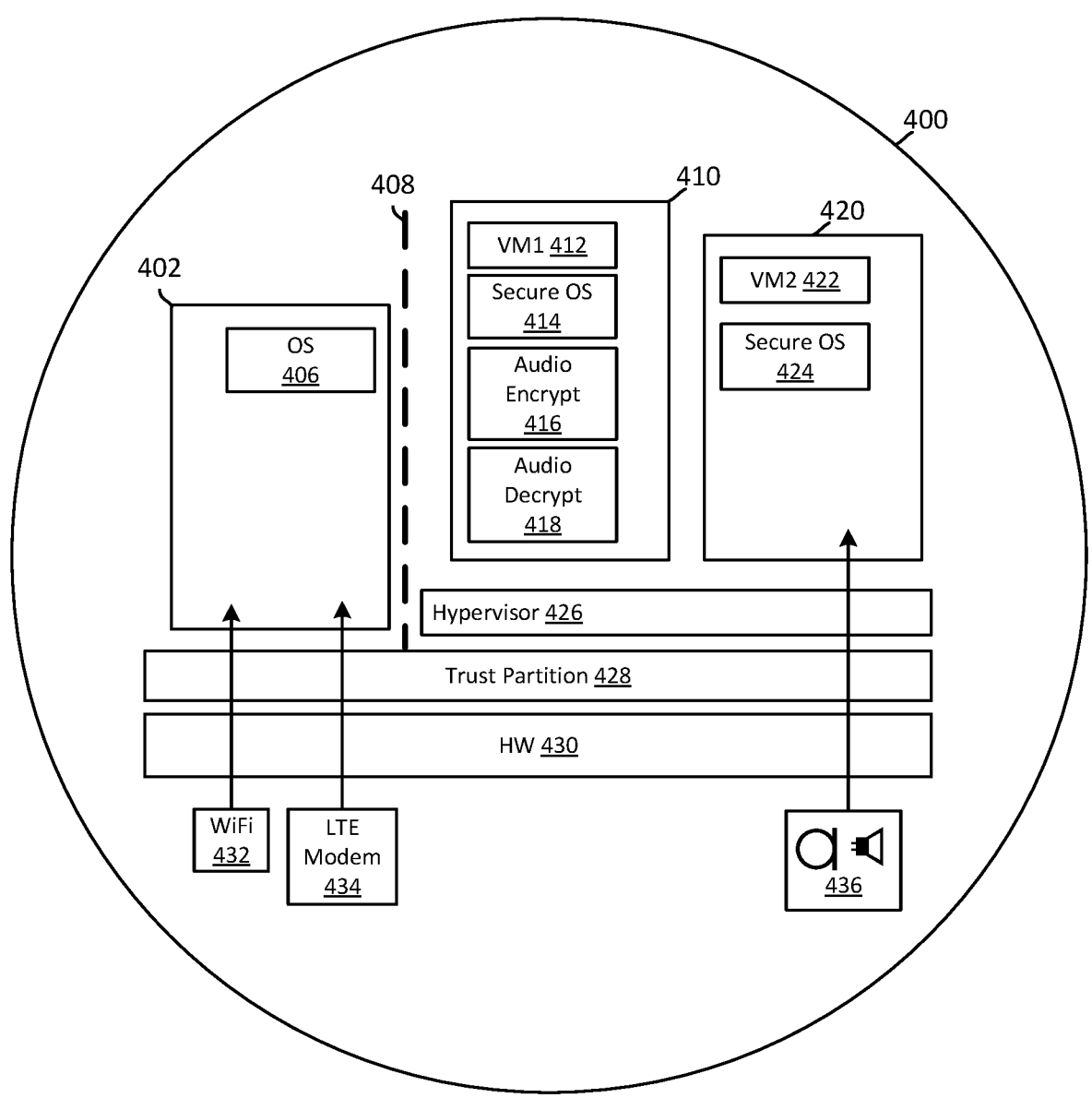
FIG. 4 is a simplified block diagram of a group communication computing device, including an SoC trust partition and a hypervisor, for protecting the integrity of trusted computing device resources utilized in sending and receiving group communications.

FIG. 4 is a simplified block diagram of a group communication computing device 400, including a trust partition 428 and a hypervisor 426, for protecting the integrity of trusted computing device resources utilized in sending and receiving group communications. The group communication computing device 400 is another example of group communication devices 106, 128, and 134 depicted in exemplary environment 100 illustrated in FIG. 1.

Group communication computing device 400 comprises first and second secure operating environments 410 and 420, and normal operating environment 402. First and second secure operating environments 410 and 420 are illustrated as being separate from normal operating environment 402 by trust line 408. Group communication computing device 400 further comprises hypervisor 426, trust partition 428, and hardware 430. Group communication device 400 also comprises WiFi resources 432 and LTE modem 434, which are operatively connected to normal operating environment 402, and microphone and speaker 436, which are operatively connected to second secure operating environment 436.

First and second secure operating environments 410 and 420 are partitioned from normal operating environment 402 via trust partition 428. According to some examples, trust partition 428 may partition first and second secure operating environments 410 and 420 from normal operating environment 402 by a division of resources. That is, first and second secure operating environments 410 and 420 may be partitioned from normal operating environment 402 by trust partition 428 by a segregated hardware set of an SoC. For example, the first and second secure operating environments 410 and 420 may define one or more processors, peripherals, memory addresses, and areas of cache as running as "secure" hardware, and normal operating environment 402 may define one or more processors, peripherals, memory addresses, and areas of cache as running as "non-secure" hardware. Trust partition 428 may dynamically expose the full SoC to secure software, or expose a subset of the SoC to normal software. As such, trust partition 428 ensures that a normal, or non-secure, processor can access only non-secure resources and receive only non-secure interrupts. In a specific example, trust partition 428 may segregate first and second secure operating environments 410 and 420 from normal operating environment 402 utilizing TRUSTZONE® technology produced by ARM®.

In the example provided by FIG. 4, the trust partition 428 allows the normal operating environment 402, and the corresponding operating system 406, to access normal, or non-secure, resources comprising WiFi resources 432 and LTE resources, such as LTE modem 434. Likewise, trust partition 428 ensures that one or more secure, or trusted, processors can access secure resources while remaining distinct from the WiFi and LTE access points, thereby providing the secure operating environments, and the corresponding secure operating systems (secure OS 414 and secure OS 424) with secure access to microphone and speaker 436, which are likely to be the targeted points of access by malicious third-parties.

Unlike the hardware subset in which normal operating environment 402 software runs, software running within first and second secure operating environments 410 and 420 has complete access to all of the SoC hardware. Thus, from the perspective of the secure operating environment's execution, the system may be perceived as being nearly identical to what would be seen on a processor that does not implement trust partition 428. As such, the secure software running on first and second secure operating environments 410 and 420 may have access to all resources associated with those secure environments, as well as the resources associated with normal operating environment 402. Thus, resources in the secure operating environments (including the speaker and microphone 436), which are under control of a trust monitor associated with first and second secure operating environments 410 and 420, are more difficult to hack or otherwise become compromised due to a malicious third-party action because they are maintained separate and distinct from third-party access points such as the LTE modem 434 and WiFi resources 432, which are under the control of normal operating environment 402 and its corresponding hardware.

Hypervisor 426 may provide additional protection against malicious third-party actions aimed at compromising the integrity of one or more of the resources of group communication computing device 400. Hypervisor 426 provides software virtualization between the first secure operating environment 410 and the second secure operating environment 420, such that those environments are perceived as individual hardware components or machines. Specifically, hypervisor 426 partitions first and second secure operating environments 410 and 420 from one another such that first secure operating environment 410 comprises a first virtual machine 412, and second secure operating environment 420 comprises a second virtual machine 422. First virtual machine 412, and corresponding secure OS 414, has access to audio encryption engine 416 and audio decryption engine 418. Second virtual machine 422, and corresponding secure OS 424, has access to microphone and speaker 436. As such, a malicious third-party attempting to access or otherwise compromise all of the secure resources of the secure operating environments would face an additional security measure comprised of virtual machine partitioning of those resources. For example one or both of virtual machines 412 and 422 may implement malware security software for detecting and limiting third-party attempts to access a secure communication pathway between first virtual machine 412 and second virtual machine 422.

Figure 5:
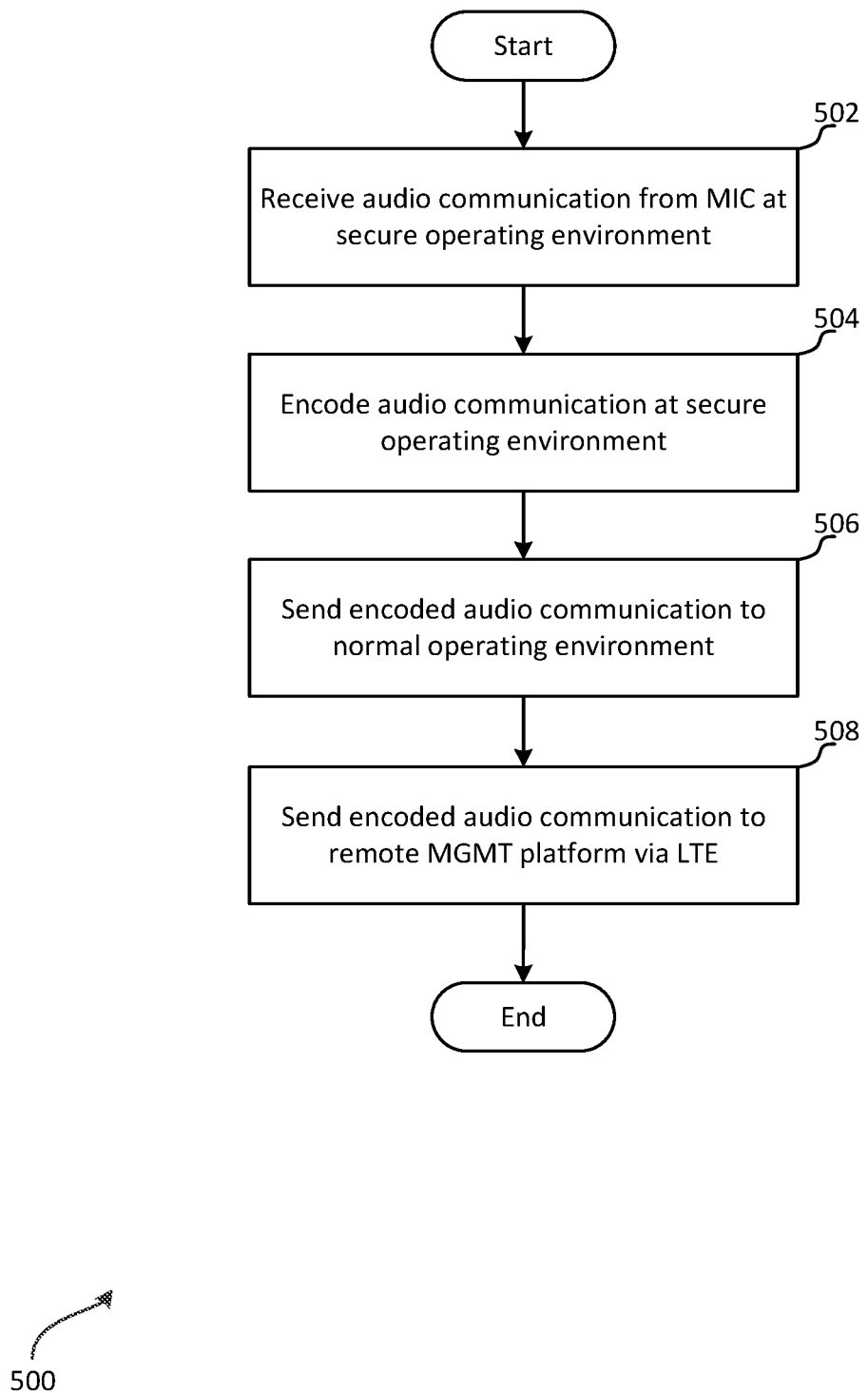
FIG. 5 illustrates an exemplary method for protecting the integrity of group communication computing devices and their corresponding resources.

FIG. 5 illustrates an exemplary method 500 for protecting the integrity of group communication computing devices and their corresponding resources. The method 500 begins at a start operation and flow continues to operation 502 where an audio communication is received from a microphone of a group communication computing device. Access to and from the microphone is controlled by a secure operating environment of the group communication computing device. According to some examples, the secure operating environment may be partitioned from one or more normal operating environments of the group communication computing device via a trust partition comprising a hypervisor. According to other examples, the secure operating environment may be partitioned from one or more normal operating environments of the group communication computing devices via a trust partition comprising an SoC physical division of hardware and corresponding resources. In either case, the normal operating environment of the group communication computing device controls access to and from LTE and WiFi resources, and the secure operating environment controls access to secure resources, which may include one or more of: a speaker, a microphone, a camera, an audio decryption engine, an audio encryption engine, an audio encoding engine, and an audio decoding engine.

From operation 502 flow continues to operation 504 where the received audio communication is encoded by an audio encoding engine of the secure operating environment of the group communication computing device. In some examples, encoding of the audio communication by the encoding engine may comprise parsing the audio communication into one or more audio messaging packets, such as one or more Opus audio packets, each of which including N audio data packet fragments.

From operation 504 flow continues to operation 506 where the encoded audio communication is sent to the normal operating environment of the group communication computing device. The normal operating environment may encompass a transport layer security (TLS) layer comprising one or more of: an encryption engine for obfuscating the encoded audio communication to the server to which it will be sent for further downstream transfer; an authentication engine for authenticating the identity of the group communication computing device to the server to which the audio communication will be sent for further downstream transfer and/or authenticating the identify of the server to which the audio communication will be sent for further downstream transfer; and a communication integrity engine for preventing message loss and/or alteration during transfer of the audio communication to the server to which the audio communication will be sent for further downstream transfer.

From operation 506 flow continues to operation 508 where the encoded audio communication is sent via LTE communication to one or more server computing devices comprising a remote management platform for routing to one or more additional group communication computing devices associated with a group-identifier of the group communication computing device. According to examples, the group-identifier may comprise a unique IP address associated with the group communication device. According to other examples, the group-identifier may be a unique identification key associated with the group communication computing device, which is encoded by a voice messaging application. In either case, the remote management platform may determine whether the group-identifier for the group communication device is associated with one or more additional group communication computing devices, and send the encoded audio communication to the one or more additional group communication devices that are associated with the group-identifier.

From operation 508 flow continues to an end operation, and the method 500 ends.

Figure 6:
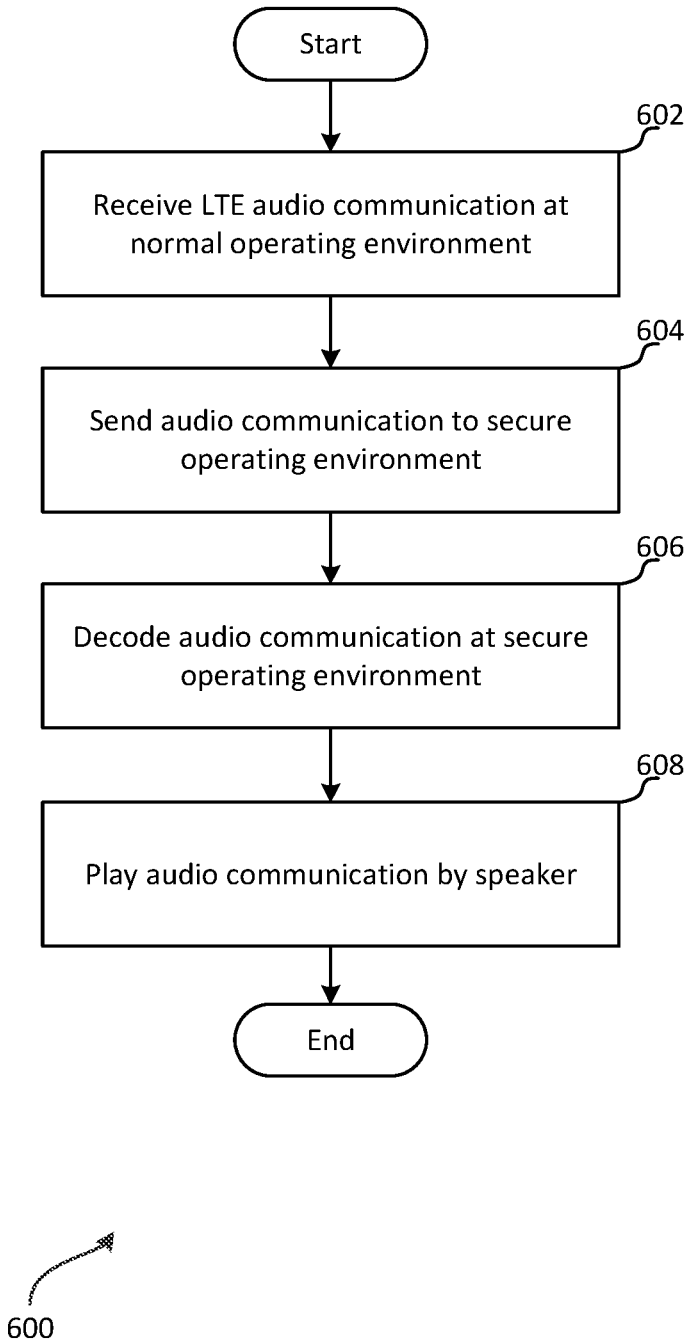
FIG. 6 illustrates an exemplary method for protecting the integrity of group communication computing devices and their corresponding resources.

FIG. 6 illustrates an exemplary method 600 for protecting the integrity of group communication computing devices and their corresponding resources. The method 600 begins at a start operation and flow continues to operation 602 where an encoded audio communication is received, via LTE communication, by a normal operating environment of a group communication computing device. The receiving group communication computing device comprises a normal operating environment and a secure operating environment. In some examples, the secure operating environment may be partitioned from the normal operating environment via a trust partition comprising a hypervisor. In other examples, the secure operating environment may be partitioned from the normal operating environment via a trust partition comprising an SoC physical division of hardware and corresponding resources. In either case, the normal operating environment of the group communication computing device controls access to and from the LTE and WiFi resources, and the secure operating environment controls access to secure resources of the group communication computing device, which may include one or more of: a speaker, a microphone, a camera, an audio decryption engine, an audio encryption engine, an audio encoding engine, and an audio decoding engine.

According to examples, the received audio communication is routed from an originating group communication computing device, to one or more server computing devices comprising a remote management platform, and sent from the remote management platform to the receiving group communication device at operation 602 based on a group-identifier associated with the originating group communication computing device and a list of one or more additional group communication devices (including the receiving group communication device) which are indicated by the list as comprising a group for which communications should be sent when an audio communication is received by the remote management platform that includes the group-identifier of the originating group communication computing device.

The normal operating environment may encompass a transport layer security (TLS) layer comprising one or more of: an encryption integrity engine for assessing whether keys used to encrypt the encoded audio communication are satisfactory; an authentication engine for authenticating the identity of the receiving group communication computing device to the server from which the encoded audio communication is sent from (i.e., the one or more server computing devices comprising the remote management platform) and/or authenticating the identity of the server from which the encoded audio communication is sent from to the receiving group communication computing device; and a communication integrity engine for ensuring there is no message loss and/or message alteration during transfer of the audio communication from the server to the receiving group communication computing device.

From operation 602 flow continues to operation 604 where the encoded audio communication is sent from the normal operating environment of the receiving group communication computing device to the secure operating environment of the receiving group communication computing device. Upon receiving the encoded audio communication at the secure operating environment of the receiving group communication device, flow continues to operation 606.

At operation 606 the audio communication is decoded, by a voice messaging application of the secure operating environment of the receiving group communication computing device, from its encoded format (e.g., an Opus codec format) for playback by one or more speakers that are under the control of a secure monitor of the secure operating environment. From operation 606 flow continues to operation 608 where the decoded audio communication is played by one or more speakers of the receiving group communication computing device.

From operation 608 flow continues to an end operation and the method 600 ends.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way.

The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A method for securing communication resources of a computing device, comprising:
   maintaining, by the computing device, a first operating environment that monitors a first set of resources of the computing device;
   maintaining, by the computing device, a second operating environment that monitors a set of secure resources of the computing device comprising a communication interface between a voice messaging application, a speaker, and a microphone, wherein the first operating environment comprises a first virtual machine and the second operating environment comprises a second virtual machine, and wherein a system-on-chip (SoC) manages switches between the first operating environment and the second operating environment;
   receiving, by the first operating environment, an LTE wireless communication comprising an audio messaging packet;
   sending the audio messaging packet from the first operating environment to the second operating environment;
   decoding, by the voice messaging application, the audio messaging packet; and
   playing, by the speaker, the decoded audio messaging packet.

2. The method of claim 1, wherein the first and second operating environments are partitioned by the SoC having a secure monitor.

3. The method of claim 2, wherein the secure monitor allows the first operating environment to access the second operating environment upon one or more operations comprising: an interrupt, an external abort, and an explicit call via a secure monitor call instruction.

4. The method of claim 3, wherein the secure monitor allows the second operating environment to access the first operating environment upon one or more operations comprising: an interrupt, an external abort, an explicit call via a secure monitor call instruction, and a direct write to a current program status register of the computing device.

5. The method of claim 1, wherein the computing device further comprises a hypervisor.

6. The method of claim 1, wherein the second operating environment comprises an audio key hashing engine and an audio decompression engine that are partitioned by a hypervisor.

7. The method of claim 1, wherein the first operating environment maintains a rich operating system and an LTE communication interface.

8. A method for securing communication resources of a computing device, comprising:
- maintaining, by the computing device, a first operating environment that monitors a first set of resources of the computing device;
- maintaining, by the computing device, a second operating environment that monitors a set of secure resources of the computing device comprising a communication interface between a voice messaging application, a speaker, and a microphone, wherein the first operating environment comprises a first virtual machine and the second operating environment comprises a second virtual machine, and wherein a system-on-chip (SoC) manages switches between the first operating environment and the second operating environment;
- receiving, by the second operating environment, an audio input via the microphone;
- parsing, by the voice messaging application, the audio input into one or more audio messaging packets;
- sending the one or more audio messaging packets to the first operating environment;
- encoding, by the first operating environment, the one or more audio messaging packets; and
- sending, from the first operating environment, an LTE wireless communication comprising the one or more audio messaging packets to a remote management platform.

9. The method of claim 8, further comprising encoding, by the first operating environment, the one or more audio messaging packets with an identification key for identifying one or more additional computing devices associated with a common communication group.

10. The method of claim 9, wherein the computing device, and each of the one or more additional computing devices associated with a common communication group, comprise a push-to-talk audio transmission attribute.

11. The method of claim 8, wherein sending the one or more audio messaging packets to the remote management platform comprises generating, by the first operating environment, one or more HTTP chunks comprised of portions of the audio messaging packet.

12. The method of claim 8, wherein the computing device further comprises a hypervisor.

13. The method of claim 8, wherein the first operating environment comprises an audio key hashing engine and an audio decompression engine that are partitioned by a hypervisor.

14. The method of claim 8, wherein the one or more audio messaging packets are Opus audio codec packets and wherein each Opus audio packet includes N audio data packet fragments.

15. A computer-readable storage device comprising executable instructions, that when executed by one or more processors, assist with securing communication resources of a computing device, the computer-readable storage device including instructions executable by the one or more processors for:
- maintaining, by the computing device, a first operating environment that monitors a first set of resources of the computing device;
- maintaining, by the computing device, a second operating environment that monitors a set of secure resources of the computing device comprising a communication interface between a voice messaging application, a speaker, and a microphone, wherein the first operating environment comprises a first virtual machine and the second operating environment comprises a second virtual machine, and wherein a system-on-chip (SoC) manages switches between the first operating environment and the second operating environment;
- receiving, by the first operating environment, an LTE wireless communication comprising an audio messaging packet;
- sending the audio messaging packet from the first operating environment to the second operating environment;
- decoding, by the voice messaging application, the audio messaging packet; and
- playing, by the speaker, the decoded audio messaging packet.

16. The computer-readable storage device of claim 15, wherein the first and second operating environments are partitioned by the SoC having a secure monitor.

17. The computer-readable storage device of claim 15, wherein the computing device further comprises a hypervisor.

18. The computer-readable storage device of claim 15, wherein the audio messaging packet is encoded with an identification key that identifies the computing device as being a member of a communication group comprising a plurality of computing devices.

19. The computer-readable storage device of claim 15, wherein the first operating environment comprises an audio key hashing engine and an audio decompression engine that are partitioned by a hypervisor.

20. The computer-readable storage device of claim 15, wherein the first operating environment further comprises a rich operating system, and the second operating environment further comprises a secure operating system and one or more secure applications.

* * * * *